(12) United States Patent
Kato et al.

(10) Patent No.: US 11,688,563 B2
(45) Date of Patent: *Jun. 27, 2023

(54) ELECTRET SHEET

(71) Applicant: SEKISUI CHEMICAL CO., LTD., Osaka (JP)

(72) Inventors: Tetsuhiro Kato, Osaka (JP); Nobuto Kamiya, Osaka (JP); Masahiro Tsuchiya, Osaka (JP); Yuuta Katsurayama, Osaka (JP); Yasuyuki Shirasaka, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 84 days.

This patent is subject to a terminal disclaimer.

(21) Appl. No.: 17/243,856

(22) Filed: Apr. 29, 2021

(65) Prior Publication Data
US 2021/0249195 A1    Aug. 12, 2021

Related U.S. Application Data

(63) Continuation of application No. 16/074,803, filed as application No. PCT/JP2017/004122 on Feb. 3, 2017, now Pat. No. 11,024,463.

(30) Foreign Application Priority Data

Feb. 4, 2016  (JP) ................. 2016-019532
Feb. 4, 2016  (JP) ................. 2016-019533

(51) Int. Cl.
*H01G 7/02*    (2006.01)
*C08J 9/10*    (2006.01)
*G01L 1/16*    (2006.01)
*H04R 19/01*   (2006.01)

(52) U.S. Cl.
CPC ............. *H01G 7/023* (2013.01); *C08J 9/103* (2013.01); *G01L 1/16* (2013.01); *H04R 19/01* (2013.01); *C08J 2201/026* (2013.01); *C08J 2201/03* (2013.01); *C08J 2323/10* (2013.01)

(58) Field of Classification Search
CPC ........ C08J 9/00; C08J 9/103; C08J 2201/026; C08J 2201/03; C08J 2323/10; C08J 2323/14; H01G 7/023; H01G 7/02; H04R 19/01; G01L 1/16
See application file for complete search history.

(56) References Cited

U.S. PATENT DOCUMENTS

2014/0091249 A1*  4/2014  Uchida .............. C08J 9/32
                                              252/62.9 R
2017/0062138 A1*  3/2017  Kamiya ............. C08J 9/0028

FOREIGN PATENT DOCUMENTS

| JP | 8-284063 | 10/1996 | |
| JP | 2011-018897 | 1/2011 | |
| WO | 2010/143687 | 12/2010 | |
| WO | 2015/137351 | 9/2015 | |
| WO | WO-2015137351 A1 * | 9/2015 | ............ C08J 9/0023 |

OTHER PUBLICATIONS

International Search Report dated Apr. 25, 2017 in International (PCT) Application No. PCT/JP2017/004122.
Hillenbrand et al., "DC-biased ferroelectrets with large piezoelectric $d_{33}$-coefficients", Journal of Applied Physics, Apr. 2, 2008, vol. 103, No. 7, pp. 74103-1-17103-7.
Extended European Search Report dated Sep. 11, 2019 in European Patent Application No. 17747608.2.

* cited by examiner

*Primary Examiner* — Christopher M Rodd
(74) *Attorney, Agent, or Firm* — Wenderoth, Lind & Ponack, L.L.P.

(57) ABSTRACT

The present invention provides an electret sheet that exhibits excellent piezoelectricity even by light stress. The electret sheet of the invention is characterized by including a charged porous sheet, in which the electret sheet has a compressive elastic modulus of 80 to 300 MPa when compressively deformed at 25° C. and a 50% compression stress of 120 to 300 kPa at 25° C., and thus has the excellent piezoelectricity for light stress and exhibits the excellent piezoelectricity even by light stress (0.5N or less) caused by a pulse wave or a breathing.

7 Claims, No Drawings

ELECTRET SHEET

TECHNICAL FIELD

The present invention relates to an electret sheet.

BACKGROUND ART

An electret sheet is a permanently internally charged material obtained by injecting electric charges into an insulating polymer material.

It is known that a foamed sheet made of a synthetic resin exhibits very high piezoelectricity comparable to that of ceramics by charging a cell membrane forming bubbles and their vicinities. It has been proposed to apply an electret that uses such a foamed sheet made of the synthetic resin to acoustic pickups, various pressure sensors, and the like by utilizing an excellent sensitivity of the electret.

As an electret sheet, Patent Literature 1 discloses an electret sheet including a chlorinated polyolefin, which has a surface charge density of $1 \times 10^{-10}$ coulomb/cm$^2$ or more.

CITATION LIST

Patent Literature

Patent Literature 1: Japanese Patent Application Laid-Open No. Hei. 8-284063

SUMMARY OF INVENTION

Technical Problem

However, the electret sheet disclosed in Patent literature 1 has a problem of exhibiting low piezoelectricity under light stress.

The present invention provides an electret sheet that exhibits excellent piezoelectricity even by light stress.

Solution to Problem

An electret sheet of a first aspect of the invention is characterized by including a charged porous sheet, in which the electret sheet has a compressive elastic modulus of 80 to 300 MPa when the electret sheet is compressively deformed at 25° C. and a 50% compression stress of 120 to 300 kPa at 25° C.

An electret sheet of a second aspect of the invention is characterized by including a charged porous sheet, in which the electret sheet has a compressive elastic modulus of 120 to 250 MPa when the electret sheet is repetitively compressed 100 times under a stress of 100 kPa and then compressively deformed at 25° C., and a 50% compression stress of 120 to 300 kPa at 25° C.

Advantageous Effects of Invention

The electret sheet of the present invention having the above-described configuration has the excellent piezoelectricity even for light stress, and thus exhibits the excellent piezoelectricity even by light stress (0.5 N or less) caused by a pulse wave or a breathing.

DESCRIPTION OF EMBODIMENTS

An electret sheet of a first aspect of the invention is characterized by including a charged porous sheet, in which the electret sheet has a compressive elastic modulus of 80 to 300 MPa when the electret sheet is compressively deformed at 25° C. and a 50% compression stress of 120 to 300 kPa at 25° C.

The electret sheet includes the charged porous sheet. The porous sheet is not particularly limited as long as a void portion is provided inside the porous sheet. However, a foamed synthetic resin sheet is preferable as the porous sheet. The synthetic resin constituting the foamed synthetic resin sheet is not particularly limited, and examples thereof include a polyolefin-based resin, such as a polyethylene-based resin and a polypropylene-based resin, polyvinylidene fluoride, polylactic acid, and a liquid crystal resin. The synthetic resin preferably includes a polyolefin-based resin, and more preferably includes a polypropylene-based resin.

The synthetic resin is preferably excellent in insulation. Specifically, the synthetic resin preferably has a volume resistivity value of $1.0 \times 10^{10}$ Ω·m or more. Here, the volume resistivity value is measured one minute after applying a voltage of 500 V according to JIS K6911 (hereinafter simply referred to as a "volume resistivity value").

The synthetic resin has the above-described volume resistivity value of preferably $1.0 \times 10^{12}$ Ω·m or more, and more preferably $1.0 \times 10^{14}$ Ω·m or more in order to obtain the electret sheet having more excellent piezoelectricity.

Examples of the polyethylene-based resin include an ethylene homopolymer and a copolymer of ethylene and at least one kind of α-olefins having 3 to 20 carbon atoms in which the ethylene component exceeds 50% by mass. Examples of the ethylene homopolymer include low-density polyethylene (LDPE) obtained by radical polymerization under a high pressure, and medium-to-low pressure processed high density polyethylene (HDPE) obtained by polymerization under medium to low pressure in the presence of a catalyst. Linear low-density polyethylene (LLDPE) can be obtained by copolymerization of ethylene and α-olefin. Examples of the α-olefin include propylene, 1-butene, 1-pentene, 1-hexene, 4-methyl-1-pentene, 1-octene, 1-nonene, 1-decene, 1-tetradecene, 1-hexadecene, 1-octadecene, and 1-eicosene. Of these, the α-olefin having 4 to 10 carbon atoms is preferable. Note that the content of the α-olefin in the linear low-density polyethylene is usually 1 to 15% by mass.

The polypropylene-based resin is not particularly limited as long as it includes more than 50% by mass of a propylene component. Examples thereof include a propylene homopolymer (homopolypropylene), and a copolymer of propylene and at least one kind of olefins having 20 or less carbon atoms other than propylene. Note that the polypropylene-based resin may be used alone, or two or more kinds thereof may be used in combination. Further, the copolymer of propylene and at least one kind of olefins having 20 or less carbon atoms other than propylene may be either a block copolymer or a random copolymer.

Note that examples of the α-olefin to be copolymerized with propylene include ethylene, 1-butene, 1-pentene, 4-methyl-1-pentene, 1-hexene, 1-octene, 1-nonene, 1-decene, 1-tetradecene, 1-hexadecene, 1-octadecene, and 1-eicosene.

A foaming ratio of the foamed synthetic resin sheet is preferably 3 to 15 times and more preferably 4 to 10 times. The foamed synthetic resin sheet having the foaming ratio of 3 times or more allows the electret sheet to exhibit the excellent piezoelectricity even by light stress, thus it is preferable. The foamed synthetic resin sheet having the foaming ratio of 15 times or less allows the electret sheet to exhibit excellent elastic restoring force against an applied stress and maintain the excellent piezoelectricity over a long period. Note that the foaming ratio of the foamed synthetic resin sheet is a value obtained by dividing a density of the whole synthetic resins constituting the foamed synthetic resin sheet by a density of the foamed synthetic resin sheet.

A thickness of the foamed synthetic resin sheet is preferably 10 to 300 µm and more preferably 30 to 200 µm. The foamed synthetic resin sheet having the thickness of 10 µm or more allows the electret sheet to exhibit excellent restoring force against an applied stress and maintain the excellent piezoelectricity over a long period. The foamed synthetic resin sheet having the thickness of 300 µm or less allows cell walls of the electret sheet to be effectively charged in a polarization state and improves the stability of the piezoelectricity of the electret sheet, and thus it is preferable.

A method of producing the foamed synthetic resin sheet is not particularly limited, and examples thereof include a method including: supplying the synthetic resin, a heat decomposable foaming agent, and if necessary, a polyfunctional monomer to an extruder; melting and kneading the mixture at a temperature lower than a decomposition temperature of the heat decomposable foaming agent; extruding a foamable synthetic resin sheet from a T-die attached to the extruder; crosslinking the foamable synthetic resin sheet as needed; and then heating the foamable synthetic resin sheet at a temperature equal to or higher than the decomposition temperature of the heat decomposable foaming agent so as to cause foaming, thereby producing the foamed synthetic resin sheet.

Examples of the heat decomposable foaming agent include azodicarbonamide, benzenesulfonyl hydrazide, dinitrosopentamethylenetetramine, toluenesulfonyl hydrazide, and 4,4-oxybis(benzenesulphonyl hydrazide).

The foamed synthetic resin sheet is preferably crosslinked using the polyfunctional monomer. Using the polyfunctional monomer can increase a crosslinking efficiency of the synthetic resin and allows the electret sheet to exhibit the excellent piezoelectricity even under light stress.

Examples of the polyfunctional monomer include divinylbenzene, trimethylolpropane tri(meth)acrylate, 1,6-hexanediol di(meth)acrylate, 1,9-nonanediol di(meth)acrylate, trimellitic acid triallyl ester, triethylene glycol diacrylate, tetraethylene glycol diacrylate, cyanoethyl acrylate, and bis(4-acryloxypolyethoxyphenyl)propane. Of these, trimethylolpropane tri(meth)acrylate, divinylbenzene, and 1,9-nonanediol di(meth)acrylate are preferable. Note that (meth)acrylate refers to methacrylate or acrylate.

The amount of the polyfunctional monomer is preferably 0.1 to 10 parts by mass, and preferably 0.5 to 8 parts by mass, relative to 100 parts by mass of the synthetic resin. The polyfunctional monomer contained in the amount of 0.1 parts by mass or more can sufficiently improve the crosslinking efficiency of the synthetic resin. The polyfunctional monomer contained in the amount of 10 parts by mass or less allows the electret sheet to exhibit the excellent piezoelectricity even under light stress.

In the production method described above, the foamable synthetic resin sheet is preferably aged. The aging of the foamable synthetic resin allows residual strain in the synthetic resin to be released. Thereby, bubbles of the resulting foamed synthetic resin sheet become homogeneous and fine. The resulting electret sheet exhibits the excellent piezoelectricity even by light stress.

An atmospheric temperature for aging the foamable synthetic resin sheet is preferably 20 to 70° C., and more preferably 20 to 50° C. The aging temperature of the foamable synthetic resin sheet being 20° C. or higher can shorten an aging time and increase the production efficiency of the foamed synthetic resin sheet. The aging temperature of the foamable synthetic resin sheet being 70° C. or lower makes the bubbles of the foamed synthetic resin sheet homogeneous and allows the resulting electret sheet to exhibit the excellent piezoelectricity even by light stress.

The aging time of the foamable synthetic resin sheet is preferably 1 to 120 hours, more preferably 2 to 72 hours, and particularly preferably 20 to 72 hours. The aging time of the foamable synthetic resin sheet being 1 hour or longer makes the bubbles of the resulting foamed synthetic resin sheet homogeneous and allows the resulting electret sheet to exhibit the excellent piezoelectricity even by light stress. The aging time of the foamable synthetic resin sheet being 120 hours or shorter enables to obtain the foamed synthetic resin sheet having excellent surface smoothness and allows the electret sheet to exhibit the excellent piezoelectricity even by light stress.

For the purpose of improving an electric charge retention capacity of the foamed synthetic resin sheet, the foamed synthetic resin sheet is preferably stretched, more preferably uniaxially stretched, and particularly preferably uniaxially stretched only in a direction orthogonal to an extrusion direction. Examples of the stretching method of the foamed synthetic resin sheet include (1) a uniaxial stretching method in which the foamed synthetic resin sheet is stretched in a longitudinal direction (an extrusion direction) or a width direction (a direction orthogonal to the extrusion direction), (2) a biaxial stretching method in which the foamed synthetic resin sheet is stretched both in the longitudinal direction (the extrusion direction) and the width direction (the direction orthogonal to the extrusion direction), (3) a stretching method in which the foamed synthetic resin sheet is stretched in the longitudinal direction (the extrusion direction) while fixing the foamed synthetic resin sheet in the width direction (the direction orthogonal to the extrusion direction) thereof, and (4) a stretching method in which the foamed synthetic resin sheet is stretched in the width direction (the direction orthogonal to the extrusion direction) while fixing the foamed synthetic resin sheet in the longitudinal direction (the extrusion direction) thereof.

The electret sheet is constituted by charging the porous sheet. A method of charging the porous sheet is not particularly limited, and examples thereof include a method of applying a direct-current electric field to the porous sheet.

The method of applying a direct-current electric field to the porous sheet is not particularly limited, and examples thereof include (1) a method of charging the porous sheet by holding the porous sheet between a pair of plate electrodes, connecting the plate electrode in contact with a surface of the porous sheet to be charged to a high-voltage direct-current power supply while grounding the other plate electrode, and applying a direct-current or pulsed high voltage to the porous sheet to inject electric charges into the synthetic resin, and (2) a method of charging the porous sheet by overlaying a grounded plate electrode on a first surface of the porous sheet in tight contact with each other, arranging needle-like electrodes or wire electrodes electrically connected to a direct-current high-voltage power supply at the side of a second surface of the porous sheet at predetermined intervals, generating corona discharge by electric field concentration near tips of the needle-like electrodes or surfaces of the wire electrodes to ionize air molecules, and repulsing air ions generated by the polarity of the needle-like electrodes or the wire electrodes.

An absolute value of a direct-current processing voltage for applying the direct-current electric field to the porous sheet is preferably 5 to 40 kV, and more preferably 10 to 30 kV. Adjusting the direct-current processing voltage within the above-described range enables to charge the porous sheet without breaking the bubbles and allows the electret sheet to obtain the excellent elastic restoring force and exhibit the excellent piezoelectricity even by light stress.

The compressive elastic modulus of the electret sheet, when the electret sheet is compressively deformed at 25° C., is 80 to 300 MPa, preferably 100 to 250 MPa, more preferably 120 to 200 MPa, and most preferably 130 to 180 MPa. The electret sheet having the compressive elastic modulus of 80 MPa or more when compressively deformed at 25° C. exhibits the excellent elastic restoring force against stress and maintains the excellent piezoelectricity over a long period. The electret sheet having the compressive elastic modulus of 300 MPa or less when compressively deformed at 25° C. has the excellent piezoelectricity even for light stress.

The compressive elastic modulus of the electret sheet, when the electret sheet is compressively deformed at 37° C., is preferably 60 to 250 MPa, more preferably 80 to 200 MPa, and particularly preferably 100 to 180 MPa. The electret sheet having the compressive elastic modulus of 60 MPa or more when compressively deformed at 37° C. exhibits the excellent elastic restoring force against stress and maintains the excellent piezoelectricity over a long period. The electret sheet having the compressive elastic modulus of 250 MPa or less when compressively deformed at 37° C. has the excellent piezoelectricity even for light stress.

The compressive elastic modulus of the electret sheet, when the electret sheet is compressively deformed at 50° C., is preferably 40 to 180 MPa, more preferably 60 to 160 MPa, and particularly preferably 80 to 140 MPa. The electret sheet having the compressive elastic modulus of 40 MPa or more when compressively deformed at 50° C. exhibits the excellent elastic restoring force against stress and maintains the excellent piezoelectricity over a long period. The electret sheet having the compressive elastic modulus of 180 MPa or less when compressively deformed at 50° C. has the excellent piezoelectricity even for light stress.

The compressive elastic modulus of the electret sheet obtained by compressively deforming the electret sheet at a measuring temperature is a value measured according to JIS K7181.

A method of controlling the compressive elastic modulus of the electret sheet obtained by compressively deforming the electret sheet at a predetermined temperature within the above-described range is not particularly limited, and examples thereof include a method of adjusting an apparent density of the porous sheet, and a method of adjusting a bending elastic modulus of the porous sheet.

When the electret sheet is repetitively compressed 100 times under a stress of 100 kPa and then compressively deformed at 25° C., the compressive elastic modulus of the electret sheet is preferably 120 to 250 MPa, more preferably 125 to 230 MPa, particularly preferably 130 to 220 MPa, and most preferably 135 to 200 MPa. The electret sheet having the compressive elastic modulus of 120 MPa or more when repetitively compressed 100 times under a stress of 100 kPa and then compressively deformed at 25° C. exhibits the excellent elastic restoring force against stress and maintains the excellent piezoelectricity over a long period. The electret sheet having the compressive elastic modulus of 250 MPa or less when repetitively compressed 100 times under a stress of 100 kPa and then compressively deformed at 25° C. has the excellent piezoelectricity even for light stress.

When the electret sheet is repetitively compressed 1,000 times under a stress of 100 kPa and then compressively deformed at 25° C., the compressive elastic modulus of the electret sheet is preferably 80 to 200 MPa, more preferably 90 to 190 MPa, and particularly preferably 100 to 180 MPa. The electret sheet having the compressive elastic modulus of 80 MPa or more when repetitively compressed 1,000 times under a stress of 100 kPa and then compressively deformed at 25° C. exhibits the excellent elastic restoring force against stress and maintains the excellent piezoelectricity over a long period. The electret sheet having the compressive elastic modulus of 200 MPa or less when repetitively compressed 1,000 times under a stress of 100 kPa and then compressively deformed at 25° C. has the excellent piezoelectricity even for light stress.

The compressive elastic modulus of the electret sheet obtained by repetitively compressing the electret sheet a predetermined number of times under a stress of 100 kPa and then compressively deforming the electret sheet at 25° C. is a value measured according to JIS K7181.

A method of controlling the compressive elastic modulus of the electret sheet obtained by repetitively compressing the electret sheet the predetermined number of times under a stress of 100 kPa and then compressively deforming the electret sheet at 25° C. within the above-described range is not particularly limited, and examples thereof include a method of adjusting an apparent density of the porous sheet, a method of adjusting a bending elastic modulus of the porous sheet, and the like.

The 50% compression stress of the electret sheet at 25° C. is 120 to 300 kPa, preferably 120 to 250 kPa, more preferably 130 to 220 kPa, and particularly preferably 130 to 200 kPa. The electret sheet having the 50% compression stress of 120 kPa or more at 25° C. exhibits the excellent elastic restoring force against stress and maintains the excellent piezoelectricity over a long period. The electret sheet having the 50% compression stress of 300 kPa or less at 25° C. has the excellent piezoelectricity even for light stress.

The 50% compression stress of the electret sheet at 37° C. is preferably 110 to 250 kPa, more preferably 110 to 220 kPa, and particularly preferably 120 to 180 kPa. The electret sheet having the 50% compression stress of 110 kPa or more at 37° C. exhibits the excellent elastic restoring force against stress and maintains the excellent piezoelectricity over a long period. The electret sheet having the 50% compression stress of 250 kPa or less at 37° C. has the excellent piezoelectricity even for light stress.

The 50% compression stress of the electret sheet at 50° C. is preferably 90 to 200 kPa, more preferably 100 to 200 kPa, and particularly preferably 110 to 160 kPa. The electret sheet having the 50% compression stress of 90 kPa or more at 50° C. exhibits the excellent elastic restoring force against stress and maintains the excellent piezoelectricity over a long period. The electret sheet having the 50% compression stress of 200 kPa or less at 50° C. has the excellent piezoelectricity even for light stress.

Note that the 50% compression stress of the electret sheet at a measuring temperature is a value measured according to JIS K6767.

A method of controlling the 50% compression stress of the electret sheet at a predetermined temperature within the above-described range is not particularly limited, and examples thereof include a method of adjusting an apparent density of the porous sheet, and a method of adjusting a bending elastic modulus of the porous sheet.

Next, an electret sheet according to a second aspect of the invention will be described. The electret sheet according to the second aspect of the invention is characterized by including a charged porous sheet, in which the electret sheet has the compressive elastic modulus of 120 to 250 MPa when the electret sheet is repetitively compressed 100 times under a stress of 100 kPa and then compressively deformed at 25° C., and the 50% compression stress of 120 to 300 kPa at 25° C.

The porous sheet and the foamed synthetic resin sheet used in the electret sheet of the second aspect of the invention are the same as the porous sheet and the foamed synthetic resin sheet used in the electret sheet of the first aspect of the invention, and thus the repeated description is omitted. The synthetic resin constituting the foamed synthetic resin sheet is the same as the synthetic resin constituting the foamed synthetic resin sheet used in the electret sheet of the first aspect of the invention, and thus the repeated description is omitted. The preferable ranges of the foaming ratio and the thickness of the foamed synthetic resin sheet are the same as the preferable ranges of the foaming ratio and the thickness of the foamed synthetic resin sheet used in the electret sheet of the first aspect of the invention, and thus the repeated description is omitted. The production method of the foamed synthetic resin sheet is the same as the production method of the foamed synthetic resin sheet used for the electret sheet of the first aspect of the invention, and thus the repeated description is omitted. The polyfunctional monomer, the preferable range of the amount of the polyfunctional monomer, and the heat decomposable foaming agent, used in the production of the foamed synthetic resin sheet, are the same as those respectively used in the production of the electret sheet of the first aspect of the invention, and thus the repeated description is omitted. The aging conditions (the atmospheric temperature and the aging time) of the foamable synthetic resin sheet are the same as the aging conditions (the atmospheric temperature and the aging time) of the foamable synthetic resin sheet optionally performed in the production of the electret sheet of the first aspect of the invention, and thus the repeated description is omitted. The stretching method of the foamed synthetic resin sheet is the same as the stretching method of the foamed synthetic resin sheet optionally performed in the production of the electret sheet of the first aspect of the invention, and thus the repeated description is omitted.

The electret sheet of the second aspect of the invention is constituted by charging the porous sheet. The method of charging the porous sheet is the same as that used for the electret sheet of the first aspect of the invention and thus the repeated description is omitted. The preferable range of the absolute value of the direct-current processing voltage for applying the direct-current electric field to the porous sheet is the same as that used for the electret sheet of the first aspect of the invention and thus the repeated description is omitted.

When the electret sheet is repetitively compressed 100 times under a stress of 100 kPa and then compressively deformed at 25° C., the compressive elastic modulus of the electret sheet is preferably 120 to 250 MPa, more preferably 125 to 230 MPa, particularly preferably 130 to 220 MPa, and most preferably 135 to 200 MPa. The electret sheet having the compressive elastic modulus of 120 MPa or more when repetitively compressed 100 times under a stress of 100 kPa and then compressively deformed at 25° C. exhibits the excellent elastic restoring force against stress and maintains the excellent piezoelectricity over a long period. The electret sheet having the compressive elastic modulus of 250 MPa or less when repetitively compressed 100 times under a stress of 100 kPa and then compressively deformed at 25° C. has the excellent piezoelectricity even for light stress.

When the electret sheet is repetitively compressed 1,000 times under a stress of 100 kPa and then compressively deformed at 25° C., the compressive elastic modulus of the electret sheet is preferably 80 to 200 MPa, more preferably 90 to 190 MPa, and particularly preferably 100 to 180 MPa. The electret sheet having the compressive elastic modulus of 80 MPa or more when repetitively compressed 1,000 times under a stress of 100 kPa and then compressively deformed at 25° C. exhibits the excellent elastic restoring force against stress and maintains the excellent piezoelectricity over a long period. The electret sheet having the compressive elastic modulus of 200 MPa or less when repetitively compressed 1,000 times under a stress of 100 kPa and then compressively deformed at 25° C. has the excellent piezoelectricity even for light stress.

The compressive elastic modulus of the electret sheet obtained by repetitively compressing the electret sheet a predetermined number of times under a stress of 100 kPa and then compressively deforming the electret sheet at 25° C. is a value measured according to JIS K7181.

A method of controlling the compressive elastic modulus of the electret sheet obtained by repetitively compressing the electret sheet the predetermined number of times under a stress of 100 kPa and then compressively deforming the electret sheet at 25° C. within the above-described range is not particularly limited, and examples thereof include a method of adjusting an apparent density of the porous sheet, and a method of adjusting a bending elastic modulus of the porous sheet.

The 50% compression stress of the electret sheet at 25° C. is 120 to 300 kPa, preferably 130 to 260 kPa, more preferably 135 to 240 kPa, and particularly preferably 140 to 220 kPa. The electret sheet having the 50% compression stress of 120 kPa or more at 25° C. exhibits the excellent elastic restoring force against stress and maintains the excellent piezoelectricity over a long period. The electret sheet having the 50% compression stress of 300 kPa or less at 25° C. has the excellent piezoelectricity even for light stress.

The 50% compression stress of the electret sheet at 37° C. is preferably 110 to 250 kPa, more preferably 110 to 220 kPa, and particularly preferably 120 to 180 kPa. The electret sheet having the 50% compression stress of 110 kPa or more at 37° C. exhibits the excellent elastic restoring force against stress and maintains the excellent piezoelectricity over a long period. The electret sheet having the 50% compression stress of 250 kPa or less at 37° C. has the excellent piezoelectricity even for light stress.

The 50% compression stress of the electret sheet at 50° C. is preferably 90 to 200 kPa, more preferably 100 to 200 kPa, and particularly preferably 110 to 160 kPa. The electret sheet having the 50% compression stress of 90 kPa or more at 50° C. exhibits the excellent elastic restoring force against stress and maintains the excellent piezoelectricity over a long period. The electret sheet having the 50% compression stress of 200 kPa or less at 50° C. has the excellent piezoelectricity even for light stress.

Note that the 50% compression stress of the electret sheet at a measuring temperature is a value measured according to JIS K6767.

A method of controlling the 50% compression stress of the electret sheet at a predetermined temperature within the above-described range is not particularly limited, and examples thereof include a method of adjusting an apparent density of the porous sheet, and a method of adjusting a bending elastic modulus of the porous sheet.

A piezoelectric sensor configured from the electret sheet of any of the first and second aspects of the invention will be described. The piezoelectric sensor is configured by integrally laminating a signal electrode on a first surface of the electret sheet and integrally laminating a ground electrode on a second surface of the electret sheet. Then, a potential generated in the electret sheet of the piezoelectric sensor can be measured by measuring a potential of the signal electrode using the ground electrode as a reference electrode.

The signal electrode is integrally laminated on the first surface of the electret sheet optionally by the intermediary of a fixative. Similarly, the ground electrode is integrally laminated on the second surface of the electret sheet optionally by the intermediary of a fixative. Note that the signal electrode and the ground electrode are not particularly limited as long as they have conductivity, and examples thereof include a metal sheet such as a copper foil and an aluminum foil, and a conductive film.

When the signal electrode and the ground electrode are configured from the conductive film, the conductive film may be formed on an electric insulating sheet and then integrally laminated on the electret sheet or directly formed on the surface of the electret sheet. Examples of a method of forming the conductive film on the electric insulating sheet or the electret sheet include (1) a method of applying and drying a conductive paste prepared by including conductive fine particles in a binder onto the electric insulating sheet or the electret sheet, and (2) a method of forming an electrode on the electric insulating sheet or the electret sheet by means of vapor deposition.

The electric insulating sheet is not particularly limited as long as it has an electrical insulation property, and examples thereof include a polyimide sheet, a polyethylene terephthalate sheet, a polyethylene naphthalate sheet, and a polyvinyl chloride sheet.

The fixative constituting the fixative layer is composed of a reactive, solvent, water-based, or hot-melt adhesive or pressure sensitive adhesive. The fixative preferably has a low dielectric constant from the standpoint of maintaining the sensitivity of the electret sheet.

EXAMPLES

Next, Examples of the present invention will be described, however the present invention is not limited to the following Examples.

The following polypropylene-based resins A to E and polyethylene-based resins A and B were prepared.
[Polypropylene-Based Resins]
Propylene-ethylene random copolymer (a polypropylene-based resin A, trade name "Novatec EG8B" manufactured by Japan Polypropylene Corp., ethylene unit content: 5% by mass)
Propylene-ethylene random copolymer (a polypropylene-based resin B, trade name "WINTEC WFW4" manufactured by Japan Polypropylene Corp., ethylene unit content: 2% by mass)
Propylene-ethylene random copolymer (a polypropylene-based resin C, trade name "WINTEC WFX4T" manufactured by Japan Polypropylene Corp., ethylene unit content: 4% by mass)
Propylene-ethylene random copolymer (a polypropylene-based resin D, trade name "WINTEC WEG7T" manufactured by Japan Polypropylene Corp., ethylene unit content: 1% by mass)
Propylene-ethylene random copolymer E (a polypropylene-based resin E, trade name "Prime Polypro B241" manufactured by Prime Polymer Co., Ltd., ethylene unit content: 2.5% by mass)
[Polyethylene-Based Resins]
Linear low-density polyethylene (a polyethylene-based resin A, trade name "EXACT3027" manufactured by Exxon Chemical Co., Ltd.) Low-density polyethylene (a polyethylene-based resin B, trade name "Novatec LE520H" manufactured by Japan Polypropylene Corp.)

Examples 1 to 5, Comparative Examples 1 to 3, 5, and 6

The polypropylene-based resins A to E, the polyethylene-based resins A and B, trimethylolpropane trimethacrylate, azodicarbonamide, and a phenolic antioxidant were supplied to an extruder in respective predetermined amounts indicated in Table 1, molten and kneaded, and extruded into a sheet form through a T-die, to produce a foamable resin sheet having a thickness of 180 µm. The foamable resin sheet was cut into a flat square shape of which one side was 30 cm.

The resulting foamable resin sheet was aged at an atmospheric temperature of 25° C. for 48 hours. Both surfaces of the resulting foamable resin sheet were irradiated with an electron beam under conditions of an accelerating voltage of 500 kV and an intensity of 25 kGy, to crosslink the polyolefin-based resin constituting the foamable resin sheet. The crosslinked foamable resin sheet was heated at 250° C. to foam the foamable resin sheet, thereby obtaining a foamed polyolefin-based resin sheet. The resulting foamed polyolefin-based resin sheet was uniaxially stretched at a stretching rate of 900 mm/min in a direction orthogonal to an extrusion direction to a thickness of 200 µm using an automatic uniaxial stretching apparatus (trade name "IMC-18C6" manufactured by Imoto Machinery Co., Ltd.) while a surface temperature of the foamed polyolefin-based resin sheet was maintained at 130° C. The foamed polyolefin-based resin sheet having a thickness of 200 µm was thus obtained. Note that a foaming ratio and thickness of the foamed polyolefin-based resin sheet were shown in Table 1.

A grounded plate electrode was overlaid on a first surface of the foamed polyolefin-based resin sheet in tight contact with each other. Needle-like electrodes electrically connected to a direct-current high-voltage power supply were arranged on a second surface of the foamed polyolefin-based resin sheet at predetermined intervals. Corona discharge was generated by electric field concentration near the surfaces of the needle-like electrodes under conditions of a voltage of −10 kV, a discharge distance of 30 mm, and voltage application time of 10 seconds to ionize air molecules. A direct-current electric field was applied to the foamed polyolefin-based resin sheet by repulsion of air ions generated by the polarity of the needle-like electrodes, to inject electric charges into the foamed polyolefin-based resin sheet. The foamed polyolefin-based resin sheet was entirely charged in this manner. The foamed polyolefin-based resin sheet was subjected to the above-described charging treatment while a surface temperature of the foamed polyolefin-based resin sheet was maintained at 40° C. using a heat gun. Then, the foamed propylene-based resin sheet having the electric charges injected therein was maintained in a state of being wrapped with a grounded aluminum foil for 3 hours to obtain an electret sheet.

Comparative Example 4

The polypropylene-based resin A, trimethylolpropane trimethacrylate, and a phenolic antioxidant were supplied to the extruder in respective predetermined amounts indicated in Table 1, molten and kneaded, and extruded into a sheet form through the T-die, to produce a polypropylene-based resin sheet having a thickness of 0.24 mm. The polypropylene-based resin sheet was cut into a flat square shape of which one side was 30 cm.

Both surfaces of the resulting polypropylene-based resin sheet were irradiated with an electron beam under conditions of an accelerating voltage of 300 kV and an intensity of 25 kGy to crosslink the polypropylene-based resin constituting the polypropylene-based resin sheet.

A grounded plate electrode was overlaid on a first surface of the polypropylene-based resin sheet in tight contact with each other. Needle-like electrodes electrically connected to the direct-current high-voltage power supply were arranged on a second surface of the polypropylene-based resin sheet at predetermined intervals. Corona discharge was generated by electric field concentration near the surfaces of the needle-like electrodes under conditions of a voltage of −20 kV, a discharge distance of 10 mm, and voltage application time of 1 minute to ionize air molecules. A direct-current electric field was applied to the polypropylene-based resin sheet by repulsion of air ions generated by the polarity of the needle-like electrodes, to inject electric charges into the polypropylene-based resin sheet. The polypropylene-based resin was entirely charged in this manner. Then, the polypropylene-based resin sheet having the electric charges injected therein was maintained in a state of being wrapped with a grounded aluminum foil for 3 hours to obtain an electret sheet.

The compressive elastic modulus obtained by compressively deforming each resulting electret sheet at 25° C., 37° C., and 50° C., and the 50% compression stress of each resulting electret sheet at 25° C., 37° C., and 50° C. were measured as described above, while an initial piezoelectric constant d33 and a high-temperature piezoelectric constant d33 of each resulting electret sheet were measured as described below. Results of the measurements were shown in Table 1.

The compressive elastic modulus obtained by repetitively compressing each resulting electret sheet 100 times or 1,000 times under a stress of 100 kPa and then compressively deforming the electret sheet at 25° C. was measured as described above, and results of the measurements were shown in Table 1.

(Piezoelectric Constant d33)

The electret sheet was cut into a test piece having a flat square shape of which one side was 10 mm. Both surfaces of the test piece were subjected to a gold vapor-deposition to prepare a test object.

A pressing force was applied to the test object using a vibration exciter under conditions of a load F of 1.0 N or 10 N, a dynamic load of ±0.25 N, a frequency of 110 Hz, and an atmospheric temperature of 25° C., and an electric charge Q (coulomb) generated in these conditions was measured. The piezoelectric constant d33 was calculated by dividing the electric charge Q (coulomb) by the load F (N). Note that, in a piezoelectric constant dij, j denotes a direction of the load and i denotes a direction of the electric charge, and thus the d33 represents the piezoelectric constant for the load in a thickness direction of the electret sheet and the electric charge in a thickness direction of the electret sheet.

The initial piezoelectric constant d33 was obtained by measuring the piezoelectric constant d33 of the electret sheet immediately after production.

The high-temperature piezoelectric constant d33 was obtained by measuring the piezoelectric constant d33 in the same manner as the initial piezoelectric constant d33 except that the atmospheric temperature was changed to 50° C.

TABLE 1

Industrial Applicability

| | | | | EXAMPLE | | | | | COMPARATIVE EXAMPLE | | | | | |
|---|---|---|---|---|---|---|---|---|---|---|---|---|---|---|
| | | | | 1 | 2 | 3 | 4 | 5 | 1 | 2 | 3 | 4 | 5 | 6 |
| COMPOSITION [PARTS BY MASS] | POLYPROPYLENE-BASED RESINS | A | NOVATEC EG8B | 100 | 0 | 0 | 0 | 0 | 100 | 100 | 100 | 100 | 0 | 0 |
| | | B | WINTEC WFW4 | 0 | 100 | 0 | 0 | 0 | 0 | 0 | 0 | 0 | 0 | 0 |
| | | C | WINTEC WFX4T | 0 | 0 | 100 | 0 | 0 | 0 | 0 | 0 | 0 | 0 | 0 |
| | | D | WINTEC WEG7T | 0 | 0 | 0 | 100 | 0 | 0 | 0 | 0 | 0 | 0 | 0 |
| | | E | PRIME POLYPRO B241 | 0 | 0 | 0 | 0 | 100 | 0 | 0 | 0 | 0 | 0 | 0 |
| | POLYETHYLENE-BASED RESINS | A | EXACT3027 | 0 | 0 | 0 | 0 | 0 | 0 | 0 | 0 | 0 | 100 | 0 |
| | | B | NOVATEC LE520H | 0 | 0 | 0 | 0 | 0 | 0 | 0 | 0 | 0 | 0 | 100 |
| | AZODICARBONAMIDE | | | 6 | 6 | 6 | 6 | 6 | 1 | 1.5 | 10 | 0 | 6 | 6 |
| | TRIMETHYLOLPROPANE TRIMETHACRYLATE | | | 3.3 | 3.3 | 3.3 | 3.3 | 3.3 | 3.3 | 3.3 | 3.3 | 3.3 | 0 | 0 |
| | PHENOLIC ANTIOXIDANT | | | 2 | 2 | 2 | 2 | 2 | 2 | 2 | 2 | 2 | 2 | 2 |
| ELECTRET SHEET EVALUATION | FOAMING RATIO (TIMES) | | | 7.8 | 8.2 | 8.3 | 7.5 | 7.8 | 1.8 | 2.5 | 14.2 | 1 | 7.7 | 8.2 |
| | THICKNESS (mm) | | | 0.23 | 0.23 | 0.23 | 0.22 | 0.20 | 0.23 | 0.23 | 0.27 | 0.24 | 0.21 | 0.21 |
| | COMPRESSIVE ELASTIC MODULUS (MPa) | 25° C. | | 153 | 163 | 140 | 175 | 160 | 850 | 551 | 101 | 3240 | 110 | 98 |
| | | 37° C. | | 132 | 138 | 129 | 139 | 139 | 775 | 504 | 88 | 3050 | 95 | 85 |
| | | 50° C. | | 111 | 120 | 103 | 121 | 109 | 722 | 485 | 67 | 2774 | 75 | 80 |
| | | (25° C.) AFTER REPEATING 100 TIMES | | 148 | 151 | 144 | 160 | 172 | 350 | 262 | 50 | 581 | 108 | 101 |
| | | (25° C.) AFTER REPEATING 1,000 TIMES | | 122 | 123 | 121 | 141 | 151 | 332 | 241 | 45 | 556 | 72 | 51 |

TABLE 1-continued

Industrial Applicability

|  |  | EXAMPLE | | | | | COMPARATIVE EXAMPLE | | | | | |
| --- | --- | --- | --- | --- | --- | --- | --- | --- | --- | --- | --- | --- |
|  |  | 1 | 2 | 3 | 4 | 5 | 1 | 2 | 3 | 4 | 5 | 6 |
| 50% COMPRESSION STRESS (kPa) | 25° C. | 175 | 173 | 152 | 201 | 189 | 722 | 630 | 108 | 5210 | 111 | 106 |
|  | 37° C. | 168 | 165 | 141 | 199 | 174 | 636 | 589 | 99 | 4980 | 105 | 100 |
|  | 50° C. | 141 | 158 | 130 | 182 | 153 | 535 | 511 | 87 | 4730 | 101 | 91 |
| INITIAL PIEZOELECTRIC CONSTANT d33 (pC/N) | 1.0N | 287 | 208 | 211 | 223 | 188 | 41 | 73 | 341 | 33 | 224 | 161 |
|  | 10N | 95 | 69 | 77 | 80 | 54 | 17 | 21 | 28 | 22 | 30 | 31 |
| HIGH-TEMPERATURE PIEZOELECTRIC CONSTANT d33 (pC/N) | 1.0N | 162 | 150 | 108 | 111 | 91 | 20 | 19 | 130 | 15 | 12 | 11 |
|  | 10N | 78 | 61 | 61 | 31 | 22 | 15 | 15 | 16 | 14 | 8 | 3 |

The electret sheet of the present invention has the excellent piezoelectricity even for light stress, and thus can be suitably used as a sensor for detecting a biological signal, such as a pulse wave and a breathing.

CROSS-REFERENCE TO RELATED APPLICATIONS

The present application claims the priority under Japanese Patent Application No. 2016-19532 filed on Feb. 4, 2016 and Japanese Patent Application No. 2016-19533 filed on Feb. 4, 2016, which are hereby incorporated in their entirety by reference.

The invention claimed is:

1. An electret sheet comprising a charged porous sheet, the electret sheet having a compressive elastic modulus of 80 to 300 MPa when the electret sheet is compressively deformed at 25° C. and a 50% compression stress of 120 to 300 kPa at 25° C., and
wherein the electret sheet excludes a low-density polyethylene resin.

2. The electret sheet according to claim 1, having a compressive elastic modulus of 60 to 250 MPa when the electret sheet is compressively deformed at 37° C. and a 50% compression stress of 110 to 250 kPa at 37° C.

3. The electret sheet according to claim 1, having a compressive elastic modulus of 40 to 180 MPa when the electret sheet is compressively deformed at 50° C. and a 50% compression stress of 90 to 200 kPa at 50° C.

4. The electret sheet according to claim 1, having a compressive elastic modulus of 120 to 250 MPa when the electret sheet is repetitively compressed 100 times under a stress of 100 kPa and then compressively deformed at 25° C.

5. The electret sheet according to claim 1, having a compressive elastic modulus of 80 to 200 MPa when the electret sheet is repetitively compressed 1,000 times under a stress of 100 kPa and then compressively deformed at 25° C.

6. The electret sheet according to claim 1, wherein the porous sheet is a foamed polypropylene-based resin sheet.

7. An electret sheet comprising a charged porous sheet, the electret sheet having a compressive elastic modulus of 80 to 300 MPa when the electret sheet is compressively deformed at 25° C. and a 50% compression stress of 120 to 300 kPa at 25° C., and
wherein the charged porous sheet consists of a polypropylene-based resin.

* * * * *